(12) United States Patent
Lorusso

(10) Patent No.: US 10,899,069 B2
(45) Date of Patent: Jan. 26, 2021

(54) MECHATRONIC MOVEMENT SYSTEM FOR THREE-DIMENSIONAL PRINTER USING HELICAL RACKS AND PINIONS

(71) Applicant: Alessio Lorusso, Bari (IT)

(72) Inventor: Alessio Lorusso, Bari (IT)

( * ) Notice: Subject to any disclaimer, the term of this patent is extended or adjusted under 35 U.S.C. 154(b) by 138 days.

(21) Appl. No.: 15/558,744

(22) PCT Filed: Mar. 14, 2016

(86) PCT No.: PCT/IB2016/051447
§ 371 (c)(1),
(2) Date: Sep. 15, 2017

(87) PCT Pub. No.: WO2016/147111
PCT Pub. Date: Sep. 22, 2016

(65) Prior Publication Data
US 2018/0117843 A1    May 3, 2018

(30) Foreign Application Priority Data

Mar. 16, 2015 (IT) .............................. RM2015A0111

(51) Int. Cl.
*B29C 64/106*    (2017.01)
*B33Y 30/00*    (2015.01)
(Continued)

(52) U.S. Cl.
CPC .......... *B29C 64/106* (2017.08); *B29C 64/112* (2017.08); *B29C 64/232* (2017.08);
(Continued)

(58) Field of Classification Search
CPC ... B29C 64/236; B29C 64/112; B29C 64/245; B29C 64/20; B29C 64/106; B33Y 30/00
(Continued)

(56) References Cited

U.S. PATENT DOCUMENTS 3,886,652 A * 6/1975 Roubloff ............ B23Q 3/15526
483/44
4,158,315 A * 6/1979 Kensrue ................. B23Q 1/262
173/32

(Continued)

FOREIGN PATENT DOCUMENTS

CN        203622961 U    6/2014
DE   10 2009 056 696 A1   6/2011
EP         2 617 554 A1    7/2013

OTHER PUBLICATIONS

Hipolite, Introducing the Roboze One 3D Printer—'Italy's First Professional 3D Printer', Feb. 27, 2015. https://web.archive.org/web/20160414050311/http://3dprint.com/47651/roboze-one-3d-printer/ (Year: 2015).*

(Continued)

*Primary Examiner* — Robert C Dye
*Assistant Examiner* — Guy F Mongelli
(74) *Attorney, Agent, or Firm* — Nixon & Vanderhye

(57) ABSTRACT

Disclosed is a mechatronic movement system for three-dimensional printing for a rapid-prototyping machine, such as a 3D printer, of the type provided with at least one microprocessor electronic management board, in which the movement of the printing way of the 3D printer along the axes X and Y of the horizontal plane is obtained exclusively with geared kinematic chains.

4 Claims, 3 Drawing Sheets

(51) Int. Cl.
  *B29C 64/232* (2017.01)
  *B29C 64/112* (2017.01)
  *B29C 64/245* (2017.01)
  *B29C 64/236* (2017.01)

(52) U.S. Cl.
  CPC .......... *B29C 64/236* (2017.08); *B29C 64/245* (2017.08); *B33Y 30/00* (2014.12)

(58) Field of Classification Search
  USPC ........................................................ 425/375
  See application file for complete search history.

(56) References Cited

U.S. PATENT DOCUMENTS

| | | | | |
|---|---|---|---|---|
| 5,121,329 | A * | 6/1992 | Crump | B22F 3/115 700/119 |
| 5,184,861 | A * | 2/1993 | Voellmer | B25J 15/026 294/119.1 |
| 5,730,817 | A * | 3/1998 | Feygin | B32B 37/1045 156/64 |
| 5,784,279 | A * | 7/1998 | Barlage, III | B41J 2/17593 700/119 |
| 6,424,107 | B1 * | 7/2002 | Lu | H02P 6/10 318/432 |
| 7,137,431 | B2 * | 11/2006 | Ederer | B22C 7/00 164/4.1 |
| 7,785,093 | B2 * | 8/2010 | Holmboe | B29C 64/135 425/185 |
| 8,668,859 | B2 * | 3/2014 | Pettis | B29C 64/106 264/308 |
| 8,934,994 | B1 * | 1/2015 | Lee | G05B 19/4099 700/47 |
| 2003/0052105 | A1 * | 3/2003 | Nagano | B23K 26/0604 219/121.83 |
| 2005/0058573 | A1 * | 3/2005 | Frost, III | B01L 9/50 422/62 |
| 2006/0108759 | A1 * | 5/2006 | Nishiko | B62D 3/12 280/93.514 |
| 2007/0082577 | A1 * | 4/2007 | Tajima | B60Q 1/076 445/66 |
| 2008/0011537 | A1 * | 1/2008 | Ozsoylu | B62D 5/04 180/422 |
| 2008/0105144 | A1 * | 5/2008 | Tetsuka | B41J 3/4073 101/38.1 |
| 2008/0142654 | A1 * | 6/2008 | Clampitt | F16M 11/10 248/187.1 |
| 2008/0181977 | A1 * | 7/2008 | Sperry | B29C 64/106 425/90 |
| 2008/0192104 | A1 * | 8/2008 | Nye | B41J 3/4073 347/110 |
| 2008/0198197 | A1 * | 8/2008 | Morris | B41J 2/16547 347/32 |
| 2008/0218541 | A1 * | 9/2008 | Tezuka | B41J 3/4073 347/8 |
| 2008/0218542 | A1 * | 9/2008 | Tezuka | B33Y 30/00 347/8 |
| 2008/0226346 | A1 * | 9/2008 | Hull | H02P 6/10 318/432 |
| 2009/0073200 | A1 * | 3/2009 | Tezuka | B33Y 30/00 347/9 |
| 2010/0100222 | A1 * | 4/2010 | Skubic | B29C 64/20 700/110 |
| 2010/0191360 | A1 * | 7/2010 | Napadensky | B33Y 30/00 347/8 |
| 2010/0196624 | A1 * | 8/2010 | Ruuttu | B23K 26/067 427/569 |
| 2011/0190446 | A1 * | 8/2011 | Matsui | B41J 3/4073 347/8 |
| 2012/0328433 | A1 * | 12/2012 | Quiroz-Hernandez | B64C 11/008 416/1 |
| 2013/0004607 | A1 * | 1/2013 | Hoechsmann | F16M 11/10 248/187.1 |
| 2013/0055838 | A1 * | 3/2013 | Hiller | F16H 19/04 74/420 |
| 2013/0064707 | A1 * | 3/2013 | Matsui | B41J 2/16547 347/32 |
| 2013/0078073 | A1 * | 3/2013 | Comb | B23Q 1/262 173/32 |
| 2013/0284089 | A1 * | 10/2013 | Knighton | B64C 11/008 416/1 |
| 2014/0178585 | A1 * | 6/2014 | Swanson | B05C 13/00 427/256 |
| 2014/0210137 | A1 * | 7/2014 | Patterson | B29C 64/106 264/401 |
| 2014/0271328 | A1 * | 9/2014 | Burris | B23K 26/034 419/53 |
| 2015/0005920 | A1 * | 1/2015 | Matsumoto | B29C 64/112 700/119 |
| 2015/0054191 | A1 * | 2/2015 | Ljungblad | B22F 3/004 264/112 |
| 2015/0072293 | A1 * | 3/2015 | DeSimone | B22F 3/115 700/119 |
| 2015/0130100 | A1 * | 5/2015 | Fiegener | B29C 64/393 264/40.1 |
| 2016/0185039 | A1 * | 6/2016 | Carbone | B29C 64/118 425/375 |

OTHER PUBLICATIONS

Atlanta Drive Systems NPL (https://web.archive.org/web/20150304193836/http://www.atlantadrives.com/racks.htm) (Year: 2015).*

Hipolite, Whitney, Introducing the Roboze One 3D Printer—'Italy's First Professional 3D Printer', 3D Printers, 3D Printing, Feb. 27, 2015, http://3dprint.com/47651/roboze-one-3d-printer/ [retrieved on Jun. 15, 2016].

International Search Report, dated Jul. 1, 2016, from corresponding PCT application No. PCT/IB2016/051447.

* cited by examiner

MECHATRONIC MOVEMENT SYSTEM FOR THREE-DIMENSIONAL PRINTER USING HELICAL RACKS AND PINIONS

The present invention relates to the sector of rapid-prototyping machines, commonly referred to by the name of "3D printers".

3D printing can be considered as the natural evolution of 2D printing and presents the major advantage of being able to provide a real reproduction of a 3D model that has previously been created with one of the current three-dimensional modelling programs. With this technique, three-dimensional objects are created via deposition of successive layers of material.

Basically, it may be said that a 3D printer uses a file of a three-dimensional model of an object and "breaks it down" to define a series of portions of the object in cross-sectional view. In other words, these portions are "slices" of the object to be created that are printed on top of one another to create the 3D object layer after layer.

There exist different 3D-printing technologies, and their main differences regard the way in which the layers are printed. Some methods use materials that fuse or are softened to produce the layers, for example, selective laser sintering (SLS) and fused deposition modelling (FDM), whereas others deposit liquid materials that are hardened using various technologies. In the case of lamination systems, there are thin layers that are cut according to the shape and joined together.

Any 3D-printing technology is characterized by advantages and disadvantages, the main factors taken into consideration being the speed, the cost of the printed prototype, the cost of the 3D printer, the choice of the materials, the colours available, etc.

Without wishing to dwell on the examination of the various 3D-printing technologies and methods, it should be noted that a problem common to all current 3D printers, regards the movement of the apparatuses that have to make the print.

Almost all currently known 3D printers use a cartesian movement governed by kinematic chains constituted by ordinary belts, pulleys, and belt-tensioners, moved by stepper motors.

Consequently, the resulting transmission ratio that derives therefrom may not be constant over time on account of the elasticity of the belts, which does not always guarantee the homogeneity of the movement and transmission of the motion along the kinematic chain. In a kinematic chain of a belt type, whether with cogged or non-cogged belts, the transmission ratio must always take into account a difference (referred to frequently as "DELTA") between the value of the force applied by the drive pulley and the value of the force to which the driven pulley is subjected, said difference between the aforesaid values being determined by the transmission of the motion through secondary components (pulleys, belt-tensioners, belts, etc.).

Belt transmission cannot be considered altogether precise as in the case of geared kinematic chains in so far as over time possible sliding and/or structural yielding of the belt itself cannot be excluded, above all if the latter is made of rubber or materials subject to wear.

It may happen, for example that to an initial motion of the drive pulley there does not correspond instantaneously a consequent motion of the driven pulley, and this is due to the presence of the belt-tensioners, which may be elastic, and/or is due to the intrinsic elasticity of the belt that connects the two pulleys.

In a transmission ratio of a geared kinematic chain (e.g., rack and pinion, gears, ballscrews with spindles), the aforesaid difference (DELTA) almost goes to zero, the geared kinematic chain being far more precise and accurate and guaranteeing over time maintenance of the initial precision.

According to a peculiar characteristic of the invention, it is envisaged that the movement of the 3D printer is obtained exclusively with geared kinematic chains, which are constituted preferably by elements with helical teeth.

A second peculiar characteristic of the invention lies in the fact that the racks for movement of the printing means along at least one of the two axes of the horizontal plane X-Y do not move and are fixed with respect to the load-bearing structure (referred to in what follows also as "chassis") so that the member carrying more weight, i.e., the rack, remains stationary, and the pinion, which carries less weight, moves along it so as to obtain a drastic reduction of the inertial masses to be displaced. Advantageously, it may be stated that moving a smaller inertial mass leads to considerable benefits, namely:

less force to be applied to overcome the initial friction;
possibility of increasing the speeds, with evident advantages in terms of shorter time for the production of a product according to the 3D-printing technique; and
reduction of the torque necessary for the motor to overcome the initial friction, as well as of that for the acceleration/deceleration of the movement of the printing head, with consequent saving in terms of power and energy, as well as in terms of costs.

As has already been mentioned, in a preferred embodiment of the invention, the use of pinions and racks with helical teeth is envisaged. The helical solution enables considerable limitation of the problems regarding friction and noise that are typical of gears with straight teeth.

This solution consequently enables precision and accuracy of the geared transmission ratios, at the same time preventing or at least reducing considerably problems regarding friction, seizing, and noise during displacements.

The solution according to the present invention affords precision of positioning on the axes X-Y of the horizontal plane with consequent operative advantages on the yield and precision of the objects that are obtained with 3D printing, which cannot be achieved with a common movement governed by belts.

It is consequently evident that there derives a competitive advantage over currently known 3D printers.

As will emerge more clearly in what follows, using for example two racks with helical teeth and corresponding pinions on the axis Y and one helical rack and pinion on the axis X, it is possible to reduce drastically the backlash that could arise during operation. The gradual and smooth meshing typical of helical teeth makes it in fact possible to use less powerful motors, hence delivering less force. Moreover, the choice of fixing the racks directly on the chassis has a strategic importance for discharging the vibrations on the chassis itself and not on the working surface, where the three-dimensional piece is being printed.

A better understanding will be obtained from the ensuing detailed description of the invention with reference to annexed drawings, which illustrate a preferred embodiment thereof, purely by way of non-limiting example.

Figure 1:
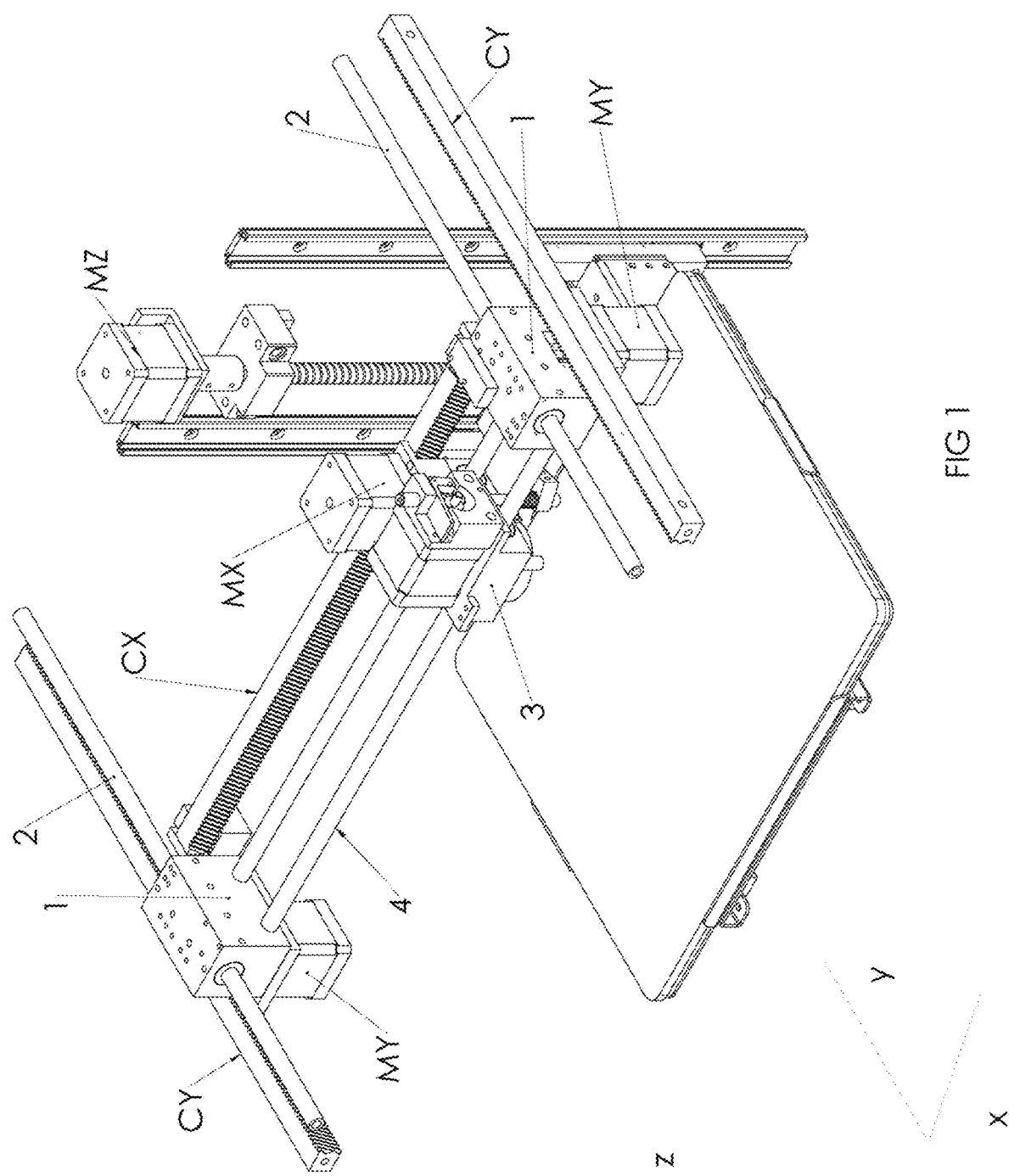
FIG. 1 is a front view that shows schematically the means for movement along the three axes X-Y-Z.
Figure 2:
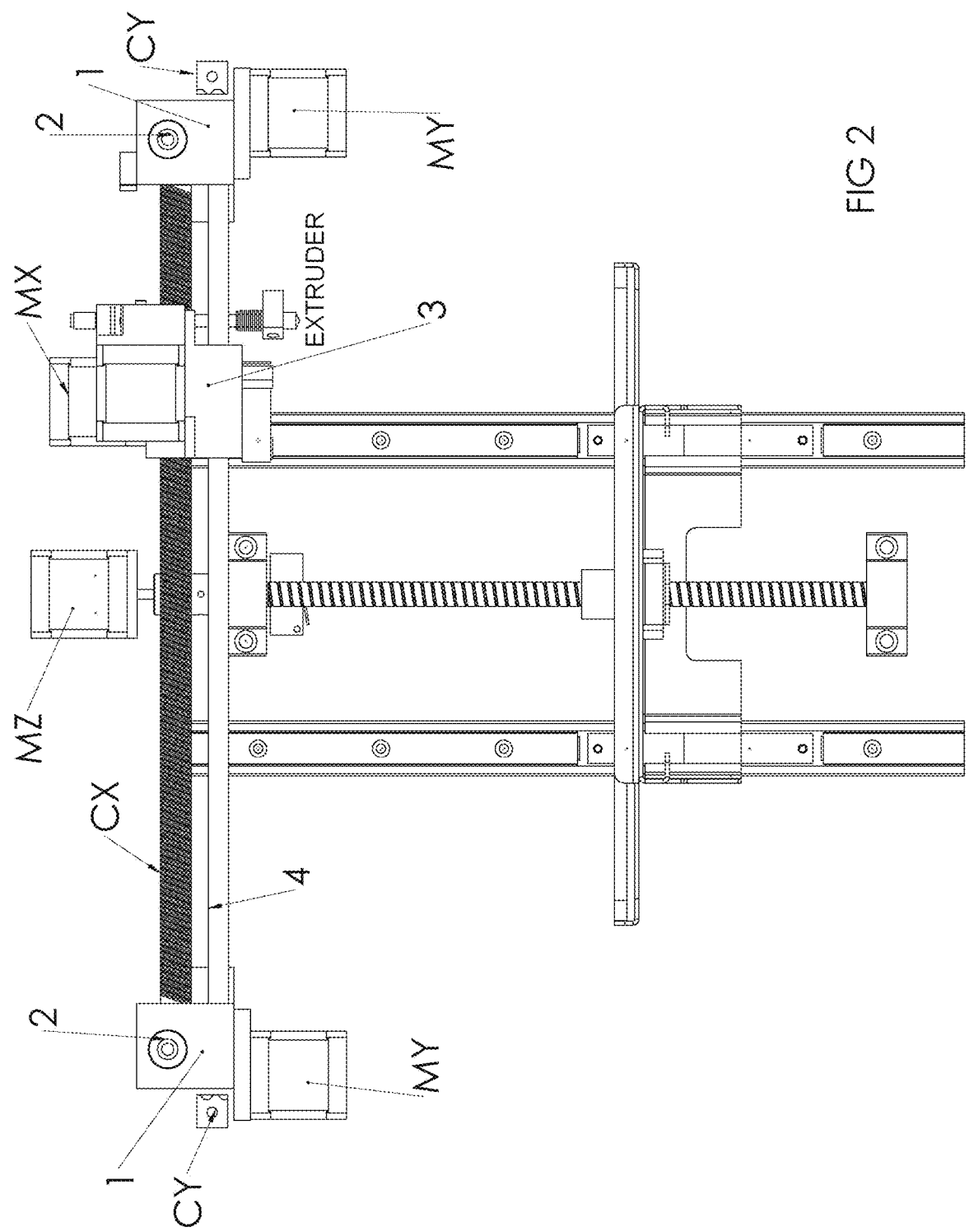
FIG. 2 is an isometric view corresponding to the previous one, which also shows the platform on which the 3D object is created.
Figure 3:
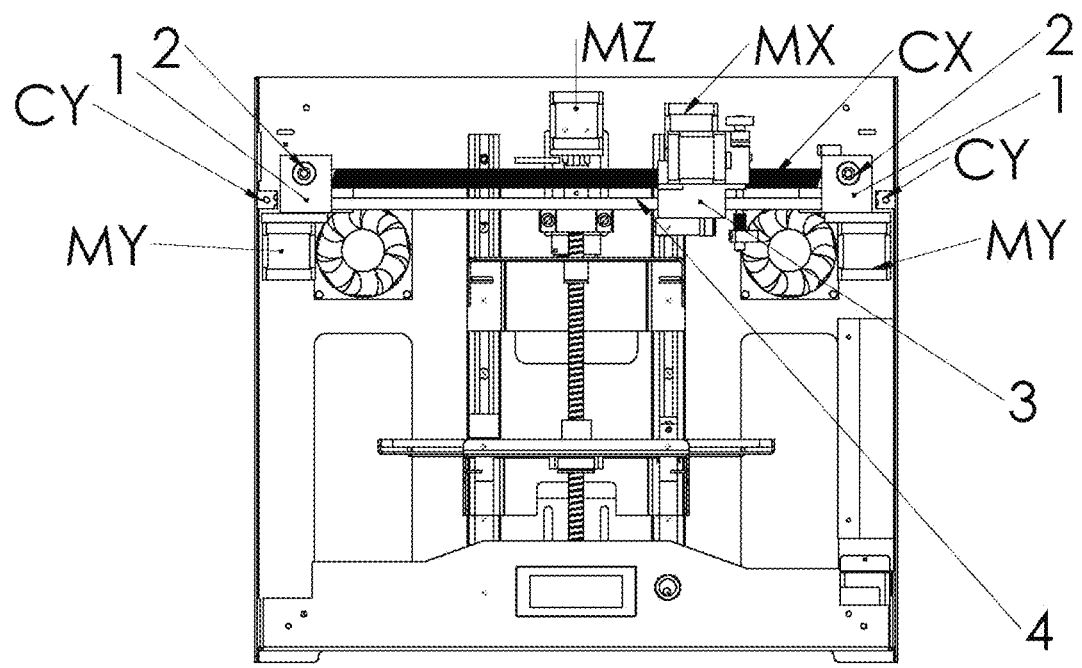
FIG. 3 is a front view of a non-limiting example of a 3D printer installed in which are the movement means according to the invention.
Figure 4:
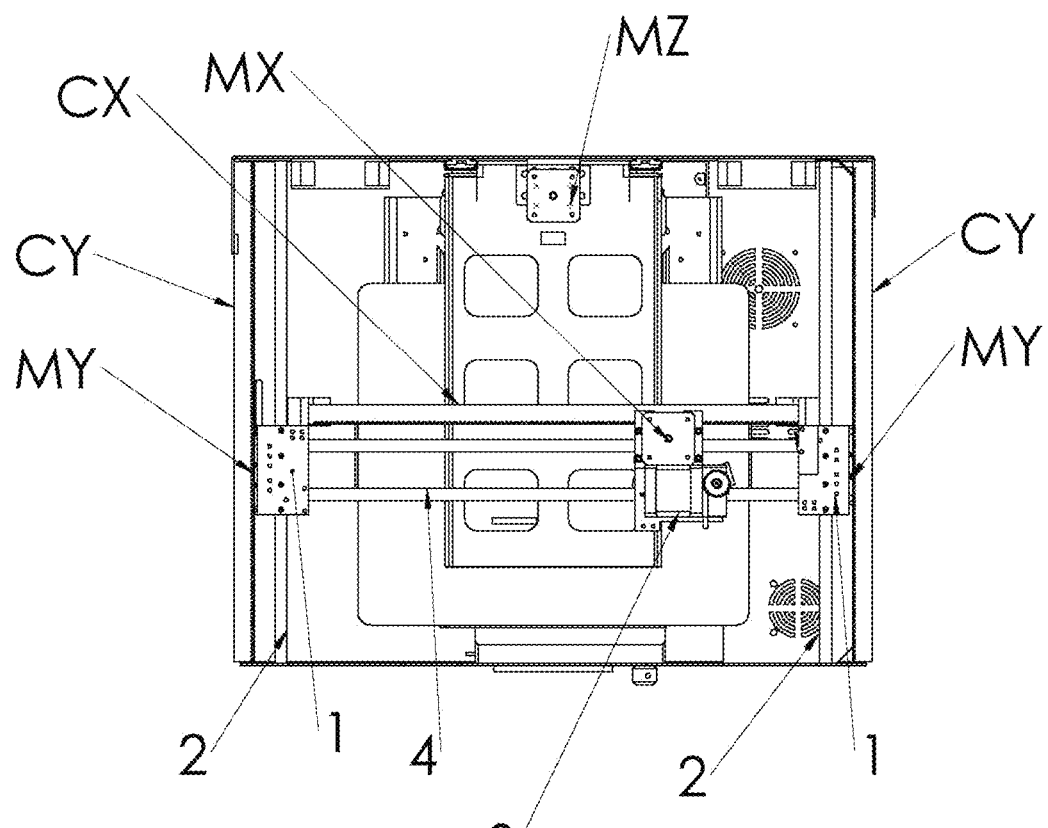
FIG. 4 is a top plan view corresponding to the previous one.

According to the invention, movement along the axis X is managed by a rack and corresponding pinion (with at least one motor), whereas for the axis Y two racks are provided with respective pinions each fitted to a motor of its own. Said motors are connected in series to guarantee uniformity of motion. In addition, a precise calibration has been made of the phases of the motors, of the currents, of the voltages, as well as of the microsteppers.

The solution with dual rack-pinion and dual motor in series, now described with reference to the axis Y, has become necessary for counterbalancing the weight and for guaranteeing uniformity of the motion along the axis Y, given that the weight along the axis Y is far heavier than along the axis X.

In fact, weighing on the axis Y is the weight of the means for displacement along the axis X: motor Mx, rack Cx, carriage 3, guides 4, printing means of a known type, such as an extruder.

In this way, the maximum precision of positioning is guaranteed.

As shown in the figures, the two motors My are fixed to respective carriages 1 that slide on guides 2 arranged according to the axis Y and parallel to the racks Cy, whereas the corresponding pinions—fitted on the axes of said motors My—always mesh on said racks Cy.

The carriages Cy are rigidly connected together via two transverse guides 4 arranged according to the axis X, which are parallel to one another and perpendicular to the aforesaid guides 2. Running along said transverse guides 4 is a third carriage 3, which is fixed with respect to a motor Mx, fitted on the axis of which is a pinion that always meshes with a corresponding rack Cx, which is also set perpendicular to said guides 2.

In the example of embodiment described, the above carriage 3 also supports the printing means 3D, which are constituted, for example, by an extruder.

As has already been mentioned, according to the invention, the guides 2 are arranged according to the axis Y and the guides 4 are arranged according to the axis X of the movement system described.

Given what has been said, the fact that the pinions of the motors always mesh with the respective racks and the fact that the teeth are of a helical type drastically reduces the play and noise of the kinematic movement chain, providing at the same time a high precision of movement and a precise control of the displacements imposed during production of the three-dimensional object.

As an alternative to the use of two motors My for movement of the carriages 1 along the guides 2 parallel to the axis Y, a single motor My may be provided fixed with respect to one of the carriages 1, and it may be envisaged to stiffen significantly the structural connection of said motor-driven carriage to the other carriage 1 for the axis Y, but this would necessarily lead to an undesirable increase in weight or costs resulting from the use of rigid materials, which are lighter but costly.

One of the possible alternatives that would enable use of a single motor for each axis, in particular for the axis Y, could be to install a pinion also on the carriage 1 without motor My, envisaging a kinematic connection of said pinion to the pinion of the carriage 1 provided with motor My, via a geared kinematic chain, such as a system of bevel gears that co-operate with a transmission shaft, which connects them kinematically so that to a rotation of the pinion of one carriage 1 there corresponds an identical rotation of the pinion on the other carriage 1.

The movements of the various motors are managed in a known way by a microprocessor electronic board, which is able to process the data contained in a 3D graphic file.

The present invention has been described and illustrated in a preferred embodiment thereof, but it will be evident to any person skilled in the branch that functionally and/or technically equivalent modifications and or substitutions may be made thereto, without thereby departing from the sphere of protection of the present industrial patent right.

The invention claimed is:

1. A rapid-prototyping machine comprising:
a three-dimensional printer;
a mechatronic movement system for said three-dimensional printer, the mechatronic movement system being configured to move said three-dimensional printer in a horizontal plane along first and second horizontal axes (Y, X) which are orthogonal to each other, the mechatronic movement system equipped with at least:
a microprocessor electronic board,
a chassis with a resting surface for a three-dimensional object to be produced by said three-dimensional printer,
a motorized ballscrew extending in a vertical axis, the motorized ballscrew connected to the resting surface to drive the resting surface and thereby move said object on the resting surface in a direction of said vertical axis,
two parallel and spaced apart first horizontal guides (2) extending in a direction of said first horizontal axis (Y),
two first horizontal racks (CY), the two first horizontal racks extending in the direction of said first horizontal axis (Y), parallel and adjacent to said two first horizontal guides (2), respectively,
a second horizontal guide (4), said second horizontal guide (4) extending in the direction of said second horizontal axis (X),
one single second rack (CX) extending in a direction of said second horizontal axis (X), said single second rack (CX) extending parallel and adjacent to said second horizontal guide (4),
two first carriages (1), the second horizontal guide (4) connecting the two first carriages (1) together with the two first carriages being respectively located at opposite ends of said second horizontal guide (4), the one single rack (CX) being connected to the two first carriages (1),
said two first carriages (1) being movable on said first horizontal guides (2), respectively,
two motorized first pinions carried by said two first carriages (1) respectively,
said two motorized first pinions meshing with the two first horizontal racks (CY),
wherein movement of said two first carriages (1) along said first horizontal guides (2) is driven by the two motorized first pinions carried by said two first carriages (1) respectively,
two first motors (MY) carried by said two first carriages (1) respectively and operatively connected to the microprocessor electronic board,
wherein said two motorized first pinions are driven by the two first motors (MY),
wherein said second horizontal guide (4) connect said two first carriages (1) to each other so that said two first carriages and said second horizontal guide (4) together define a bridge unit movable in the direction of the first horizontal axis (Y) on said two first horizontal guides (2), the two first carriages (1) being respectively located at opposite ends of the bridge unit, a second carriage (3) movable on said second horizontal guide (4) in the direction of said second horizontal axis (X), said second carriage supporting said three-dimensional printer, so that said three-dimensional printer is movable both in the direction of said first horizontal axis (Y) and in the direction of said second horizontal axis (X) due to a movement of said bridge unit relative to said two first horizontal guides (2) and due to a movement of said second carriage (3) relative to said second horizontal guide (4), said single second rack (CX) being connected to said two first carriages (1) so as to be movable along with said two first carriages (1) and said second horizontal guide (4) in the direction of said first horizontal axis (Y) relative to said two first horizontal guides (2), and a motorized single second pinion carried by said second carriage (3), wherein the movement of said second carriage (3) along said second horizontal guide (4) is driven by the motorized single second pinion carried by said second carriage (3), said single second pinion meshing with said single second rack (CX), wherein said two first horizontal racks (CY), said two first pinions, said one single second rack (CX), and said single second pinion all have helical teeth.

2. The rapid-prototyping machine according to claim 1, further comprising a second motor carried by said second carriage, wherein said motorized single second pinion is driven by said second motor carried by said second carriage.

3. The rapid-prototyping machine according to claim 2, further comprising a third motor carried by said chassis, wherein said motorized ballscrew is driven by said third motor carried by said chassis.

4. The rapid-prototyping machine according to claim 1, further comprising a third motor carried by said chassis, wherein said motorized ballscrew is driven by said third motor carried by said chassis.

* * * * *